United States Patent
Dai et al.

(10) Patent No.: US 6,650,322 B2
(45) Date of Patent: Nov. 18, 2003

(54) COMPUTER SCREEN POWER MANAGEMENT THROUGH DETECTION OF USER PRESENCE

(75) Inventors: Xia Dai, San Jose, CA (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 09/750,622

(22) Filed: Dec. 27, 2000

(65) Prior Publication Data

US 2002/0080132 A1 Jun. 27, 2002

(51) Int. Cl.[7] .............................................. G09G 5/00
(52) U.S. Cl. ....................................................... 345/212
(58) Field of Search ................................ 345/212, 211, 345/156, 741; 713/176, 177, 182; 725/9, 10, 11; 382/116, 118, 119

(56) References Cited

U.S. PATENT DOCUMENTS

| | | | | | |
|---|---|---|---|---|---|
| 5,029,982 | A | * | 7/1991 | Nash | 349/72 |
| 5,838,578 | A | * | 11/1998 | Pippin | 364/488 |
| 5,909,106 | A | * | 6/1999 | Ryon et al. | 323/222 |
| 5,918,060 | A | * | 6/1999 | Jeong | 713/324 |
| 6,101,610 | A | * | 8/2000 | Beebe et al. | 713/323 |
| 6,111,517 | A | * | 8/2000 | Atick et al. | 340/825.34 |
| 2002/0152037 | A1 | * | 10/2002 | Sunshine et al. | 702/23 |

* cited by examiner

Primary Examiner—Richard Hjerpe
Assistant Examiner—Ronald Laneau
(74) Attorney, Agent, or Firm—Blakely, Sokoloff, Taylor & Zafman LLP

(57) ABSTRACT

An apparatus is described for detecting presence of a user. The apparatus includes at least one thermal sensor to sense temperature around a define area of a computer system and a user presence detection subsystem coupled to the thermal sensor. The user presence detection subsystem determines presence of a user by analyzing signals output by the thermal sensor during a sampling period.

32 Claims, 7 Drawing Sheets

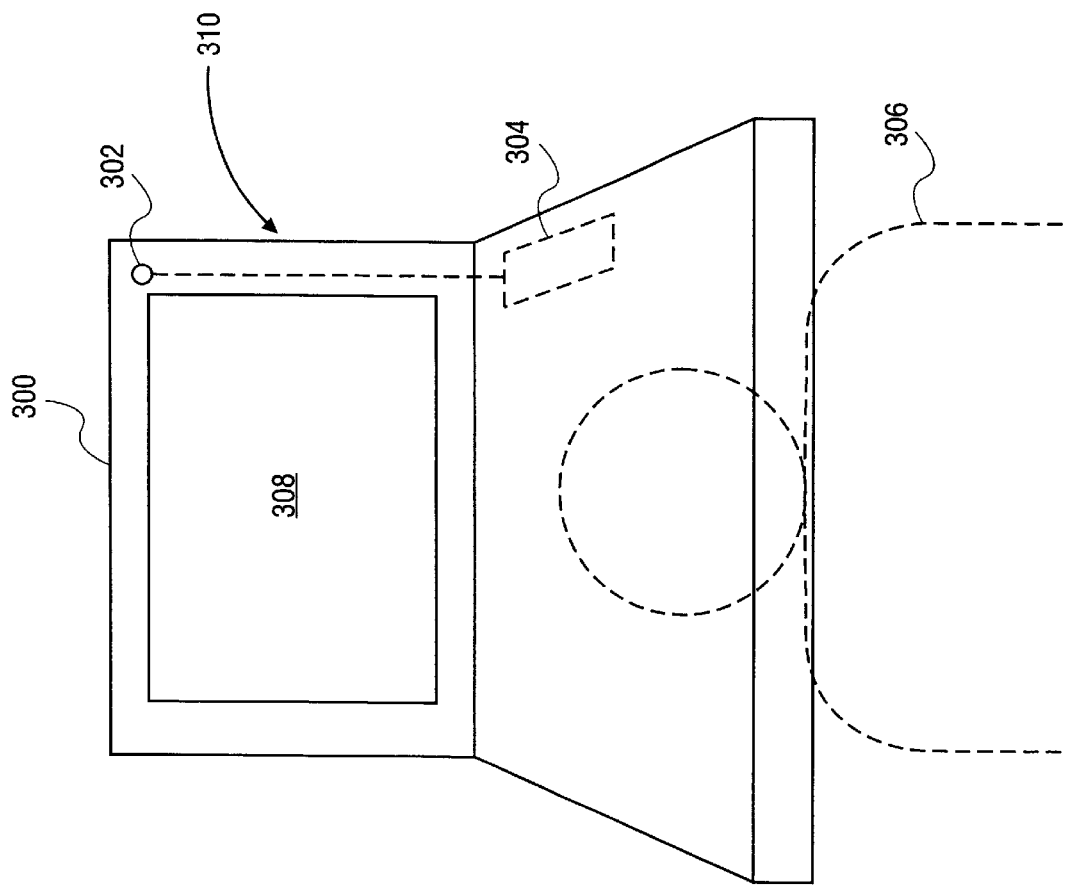

COMPUTER SCREEN POWER MANAGEMENT THROUGH DETECTION OF USER PRESENCE

BACKGROUND OF THE INVENTION

1. Field of the Invention

The present invention generally relates to a computer power management system, and in particular to a computer power management through detection of user presence.

2. Description of the Related Art

Computer systems use a display device such as a liquid crystal display (LCD), a cathode-ray tube (CRT), an electroluminescent (EL) display, a plasma display panel and the like, to display information to a user. A display device can consume a substantial amount of the total energy resource used by the computer system. The amount of power consumed by the display device is greater concern with portable computers since they must rely on a portable power source such as a battery to provide electrical power when an electrical power outlet is not readily accessible. In some portable computers, the display device such as LCD may consume between 30% to 40% of the total power demand of the computer.

Various power management systems are employed by computer systems to reduce the amount of power consumed. Some conventional computer systems use a timer based power management scheme that turns off the display device when no input activity has been present for a defined time (e.g., 5–30 minutes) and turns the display device back on when a user operates an input device such as a keyboard or a pointer device. The duration of idle time period the computer must wait before turning off the display device is typically set by a user. One problem associated with such timer based scheme is that if the user sets the duration of the idle time period to be a relatively long time (e.g., 15 minutes or more), valuable electrical power may be wasted from the time when the user leaves the computer unattended until the time when the display device is automatically powered down by the timer based power management.

BRIEF DESCRIPTION OF THE DRAWINGS

FIG. 3 is a diagrammatic perspective view of a portable computer incorporating the user detection system according to one embodiment of the invention.

DETAILED DESCRIPTION OF THE INVENTION

Figure 1:
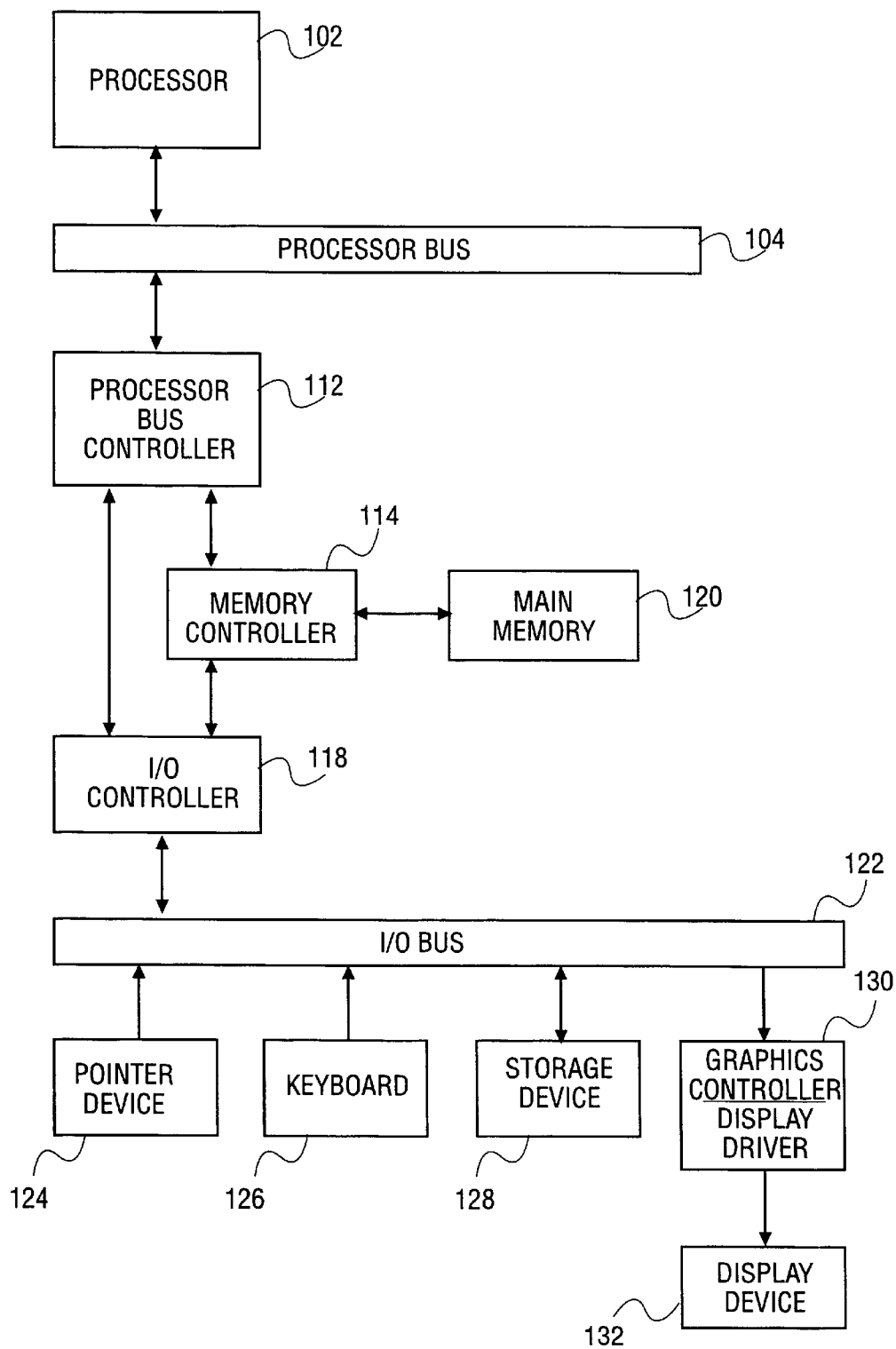
FIG. 1 is a block diagram of one embodiment of a computer system suitable for use with the present invention.

FIG. 1 depicts one embodiment of a computer system in which a power management system of invention may be implemented. The computer system includes a processor 102 coupled a processor bus 104. In one embodiment, the processor 102 is a processor from the Pentium® family of processors including the Pentium®, Pentium® Pro, Pentium® II and Pentium® III processors available from Intel Corporation of Santa Clara, Calif. Alternatively, other processors may be used. A processor bus controller 112 is coupled to the processor bus 104. In the illustrated embodiment, a main memory 120 is coupled to the processor bus controller 112 via a memory controller 114. Also included in the computer system are a number of I/O devices coupled to an input/output (I/O) controller 118 via an I/O bus 122. I/O devices may include a pointer device 124, a keyboard 126, a storage device 128 (e.g., hard disk drive), a graphics controller/display driver 130 driving a display device 132. While in the illustrated computer system, the graphics controller 130 is coupled to the I/O bus 122, it should be understood by one skilled in the art that the graphics controller 130 may be coupled to the memory controller 114 instead of the I/O bus. Alternatively, other configurations may also be used.

Figure 2A:
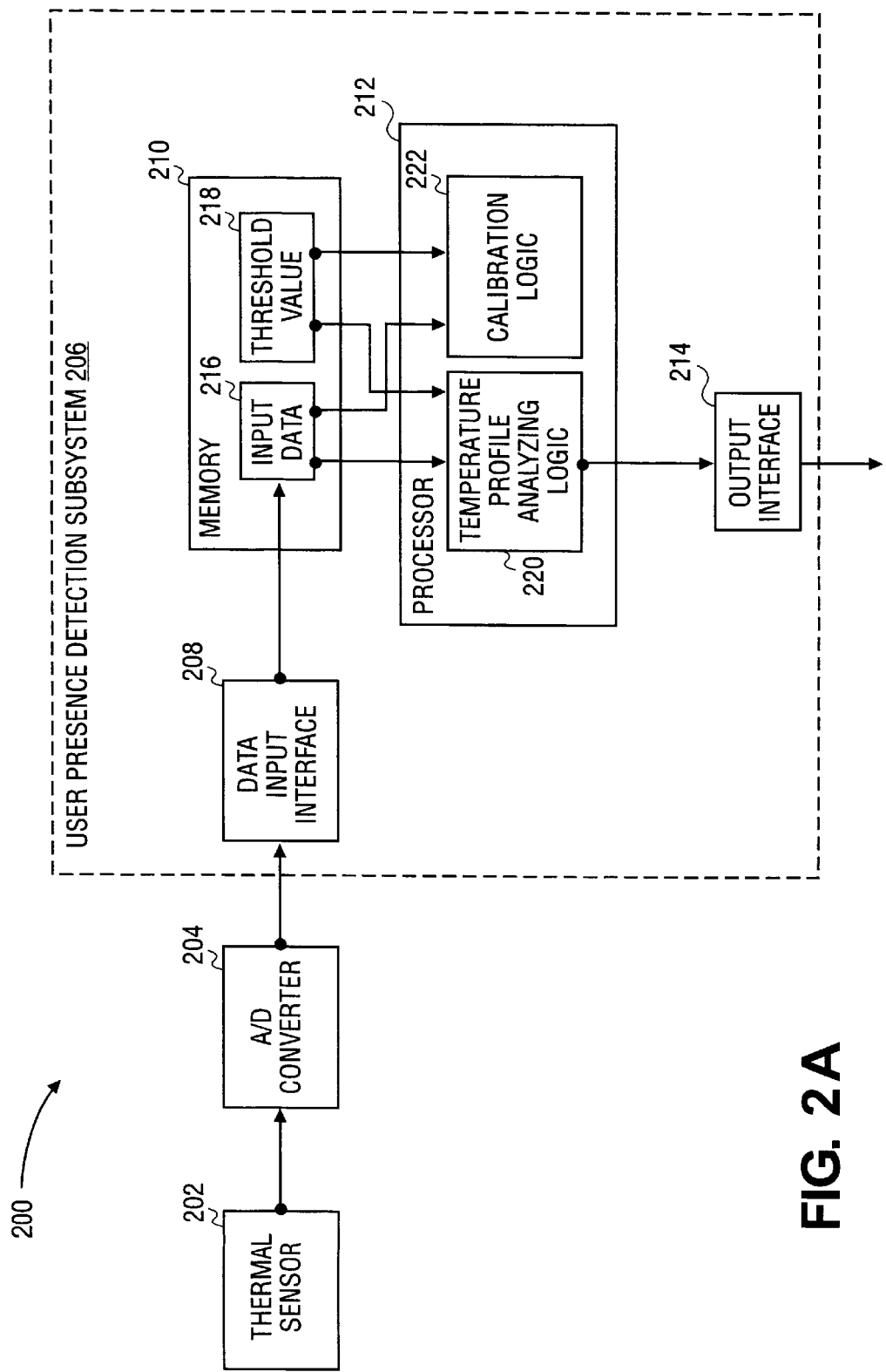
FIG. 2A is a block diagram of a user detection system according to one embodiment of the invention, using a thermal sensor.

FIG. 2A depicts a user detection system 200 for use with a power management system to detect presence of a user according to one embodiment of the invention. The user detection system 200 includes one or more thermal sensor 202 to sense the temperature and an analog-to-digital (A/D) converter 204 to digitize the analog signals produced by the thermal sensor 202 into digital data before forwarding the temperature data to a user presence detection subsystem 206. The user presence detection subsystem 206 processes the thermal profile information output by the thermal sensor 202 to determine presence of a user. In the illustrated embodiment, the user presence detection subsystem 206 includes a data input interface 208 to received the incoming data and store the data in a memory 210. The input data collected during a sampling time period is then analyzed by a temperature profile analyzing logic 220 running in a processor 212 to determine presence of a user.

Inventors have recognized that since user breathing is a periodic event, such breathing pattern of the user will be reflected on the temperature profile around the sensing region of the thermal sensor 202 (e.g., display screen area). In this regard, the presence of a user facing the display screen can be detected by monitoring the difference in the amount of heat emitted during inhale and exhale, as sensed by the thermal sensor 202. In one implementation, the length of sampling time period is selected to cover at least one complete breathing cycle. In another implementation, the length of sampling time period is selected to cover multiple breathing cycles to determine if the pattern of temperature fluctuation is consistent with a normal fluctuation pattern of human breathing.

In one implementation, the temperature profile analyzing logic 220 is configured to detect an amount of temperature fluctuation occurring within a sampling time period and determine presence of a user based on the temperature fluctuation value and a threshold value 218 stored in the memory 210. The threshold value 218 is used to differentiate between temperature fluctuation caused by the ambient environment and temperature fluctuation caused by user presence. Accordingly, when the temperature fluctuation value falls below the threshold value 218, this means that a user is either not present or not facing the display screen. On the other hand, if the temperature fluctuation value exceeds the threshold value 218, this means that the temperature fluctuation detected by the user detection system 200 is most likely caused by user breathing near the computer display screen.

The threshold value 218 may be statically set at a predefined value. Alternatively, the threshold value 218 may be dynamically calibrated by a calibration logic 222 to compensate for different users. Some users may produce greater amount of temperature fluctuation than other users for various reasons, perhaps because some users sit closer to the display screen than other users, when using their computers. In this regard, the threshold value 218 may be occasionally calibrated based on temperature fluctuation value obtained when the calibration logic 222 knows that a user is actually present in front of the computer (e.g., when the user actuates an input key on the keyboard). When calibrating the threshold value 218, the calibration logic 222 may also take into consideration the amount of ambient temperature fluctuation sensed by the thermal sensor 202 during a sampling time period when a user is not present.

In one embodiment, the user detection system 200 is integrated into a computer system as a single unit. For example, the temperature profile analyzing logic 202 and calibration logic 222 may be embodied in the form of software programs running in a processor (e.g., central processing unit, or processing unit in one of the controllers such as I/O controller). In an alternative embodiment, the user detection system 200 is incorporated into a separate electronic unit instead of being integrated into a computer system. For example, the user presence detection subsystem 206 for analyzing the information provided by the thermal sensor 202 may be embodied in the form of a low power embedded digital signal processor (DSP). The DSP may include a memory to store incoming input data from the A/D converter and to store a threshold value, a processing circuit to determine an amount of temperature fluctuation during a sampling time period and a comparator to compare the temperature fluctuation value computed by the processing circuit to the threshold value stored in the memory. The DSP may include an output interface to communicate the result of its analysis of the temperature information to a computer system.

Once the temperature profile analyzing logic has completed its analysis of the temperature fluctuation occurring within the sample time period, this information is communicated to the rest of the computer system via an output interface 214. There are a number of ways in which this information can be used to more effectively regulate electrical power supplied to various components of a computer system. For example, the user detection system 200 may be configured to notify the Operating System (OS) power management when it is time to place certain components of the computer system in a power saving mode by forwarding a power saving command via the output interface 214. In response to receiving the power saving command, the OS power management will direct power state transitions of the selected components from a normal operation mode to a power saving mode. Similarly, in returning from the power saving mode, the user detection system 200 may send a normal operation command to the OS power management to put those components back in the normal operation mode.

In one embodiment, the user detection system 200 provides an improved display screen power management for computer systems. In this embodiment, the commands issued by the user presence detection subsystem 206 may be used by the display screen power management to more effectively conserve power consumed by the display system. For example, the display screen may be activated only when the user detection system 200 detects presence of a user and the display screen will be turn off if the user is either leaves the computer area or is not facing the display screen. This may be achieved by configuring the Operating System power management to put display related components (e.g., display device, display driver, graphics controller) in a power saving mode (e.g., standby mode or suspend mode) in response to a power saving command received from the user detection system 200. In one implementation, the display screen power management is configured to turn on/off only the screen backlight of a liquid crystal display. In another implementation, the display screen power management is configured to turn on/off the screen backlight, a display driver, and a graphics controller, or any combination thereof.

One known power management technique uses a timer based scheme to place the computer system in a power saving mode (e.g., standby mode or suspend mode) when no input activity has been present for a defined time (e.g., 5–15 minutes). In existing computer systems, various components of the computer system can be set to a power saving mode, such as a hard drive, a central processing unit, a chipset and the like. In one embodiment, the user detection system 200 is used in combination with a timer based power management system or with any other suitable type of power management to more effectively reduce the amount of power consumed by the computer system. By incorporating the user detection system 200 of the present invention into an existing power management, the amount of time a portable computer can be used between recharging can be further extended.

By using the user detection system 200 of the present invention to enhance the conventional power management system, a number of advantages can be achieved. For example, the information derived by the user detection system 200 may be used by the power management system to enable the display screen power to be managed in a relatively short increments (e.g., less than a minute) as opposed to five to thirty minutes usually required by a conventional timer based power management. As a result, the user detection system 200 is able to significantly reduce the time granularity of turning on/off the display screen and therefore can reduce power consumed by the display screen more efficiently.

Figure 2B:
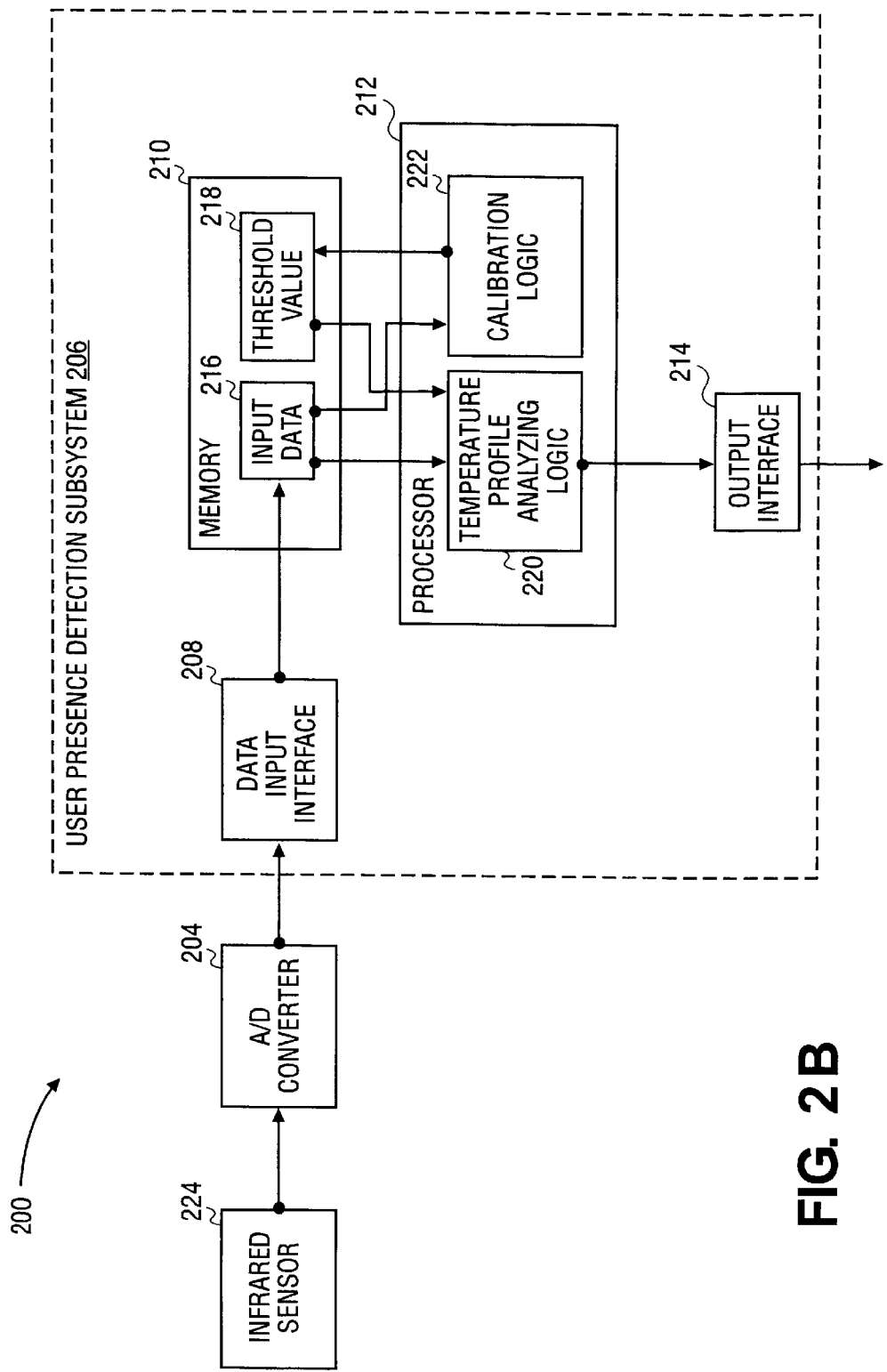
FIG. 2B is a block diagram of a user detection system according to another embodiment of the invention, using an infrared sensor.

FIG. 2B depicts a user detection system 200 according to another embodiment of the invention that uses an infrared sensor 224 to detect a user presence by sensing body temperature within its field of view. In this embodiment, the user presence detection subsystem 206 coupled to the infrared sensor 224 is configured to detect user presence by monitoring the temperature profile of objects within its field of view. In one implementation, the temperature profile analyzing logic 220 of the user presence detection subsystem 206 is configured to detect a user presence by determining if the temperature of an object within the field of view of the infrared sensor falls within certain temperature range, since the temperature of the user's body is usually higher than the temperature of the surrounding area, such as chair, desk, etc.

FIG. 3 depicts a portable computer 300 incorporating a user detection system 310 according to one embodiment of the invention. As shown in FIG. 3, a thermal sensor 302 is incorporated into the portable computer 300 to sense the temperature of air around the display screen area. In the illustrated embodiment, the thermal sensor 302 is placed on a top corner of the front side of LCD screen 308. Reducing energy consumption is especially important for portable computers such as notebooks, subnotebooks, laptops, handheld devices and personal digital assistant since portable computers must obtain power from its internal electric battery when an electrical outlet is not readily available. In one embodiment, the user detection system 310 is used to place the display device 308 (e.g., LCD) in a power saving mode when a user 306 leaves the computer area. In another embodiment, the user detection system 310 is used to place the display device 308 in a power saving mode when the user 306 is not facing the display screen 308. By doing so, the user detection system 310 is able to advantageously increase the amount of time the portable computer can be used between recharging. While the illustrated embodiment is shown with the thermal sensor 302 placed adjacent to the display screen 308, the thermal sensor 302 may be placed in other locations of the computer to sense temperature fluctuation, including on or near the keyboard of the portable computer.

Figure 4:
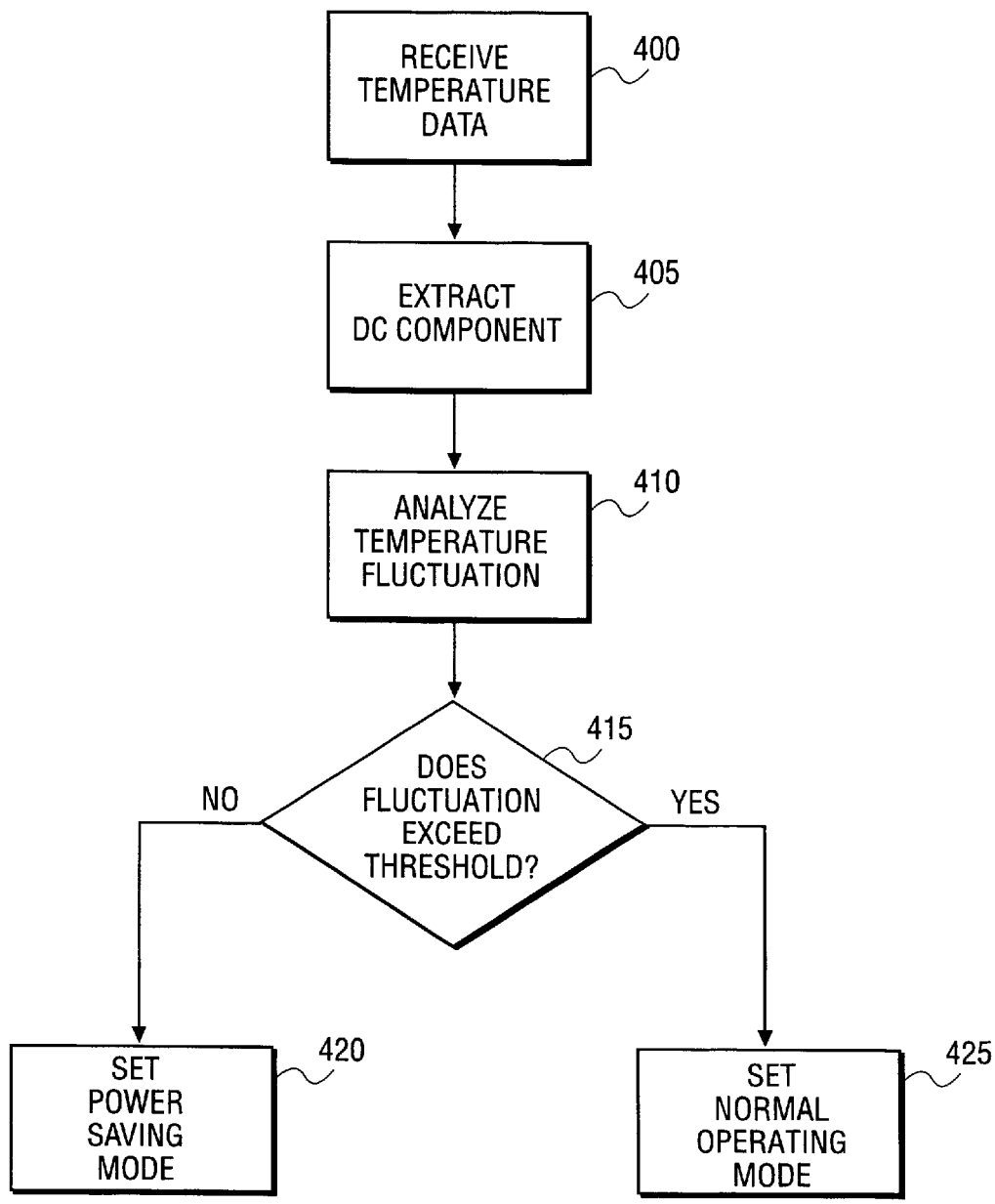
FIG. 4 is a flowchart of operation of user presence detection process according to one embodiment of the invention.

FIG. 4 depicts operations of a temperature profile analyzing logic according to one embodiment of the invention. In functional block 400, the temperature profile analyzing logic receives temperature data from a thermal sensor for the duration of a sampling time period. In one implementation, the temperature profile analyzing logic includes a filter to extract DC (direct current) component of the data (block 405). Once the DC component of the data has been extracted, the temperature fluctuation in the data is analyzed to determine if the pattern of fluctuation is consistent with a normal fluctuation period of human breathing (block 410). Then, the amount of temperature fluctuation computed by the temperature profile analyzing logic is compared with a threshold value in decision block 415. If the amount of temperature fluctuation is less than the threshold value (block 415, no), this means that a user is either absent or not facing the display screen and the temperature profile analyzing logic will issue a command to place certain components such as the display screen, display driver and graphics controller in a power saving mode (block 420). This is based on the fact that the temperature around the sensing region of the thermal sensor will usually be relatively constant when the user is either absent or not facing the computer display screen. If the amount of temperature fluctuation exceeds the threshold value (block 415, yes), this means that a user is in front of the computer looking at the computer display screen and the selected components will be set to normal operation mode (block 425).

Figure 5:
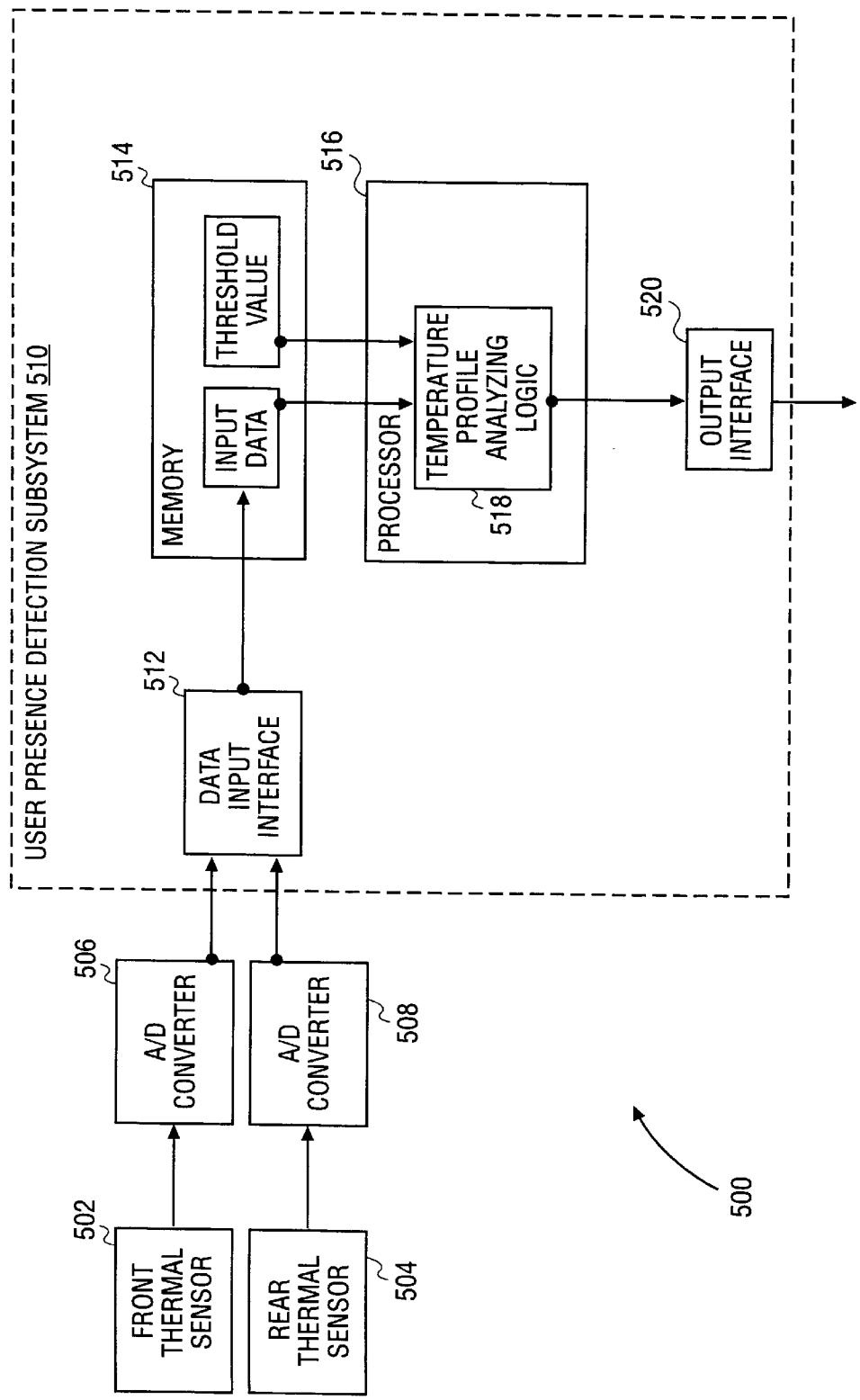
FIG. 5 is a block diagram of a user detection system according to another embodiment of the invention.

FIG. 5 depicts a user detection system 500 for use with a power management system to detect presence of a user according to another embodiment of the invention. In this embodiment, the user detection system 500 includes a front thermal sensor 502 and a rear thermal sensor 504 to sense temperature fluctuations in both the front and rear areas of a display screen panel. The front thermal sensor 502 is positioned next to a display screen facing towards the user; and the rear thermal sensor 504 is positioned behind the display screen facing away from the user. In this embodiment, the temperature profile analyzing logic 518 is configured to compare the thermal profile output by both the front and the rear thermal sensors. By comparing temperature fluctuation patterns derived from the front and rear thermal sensors, the user detection system according to this embodiment is able to more accurately determine the presence of a user.

Figure 6:
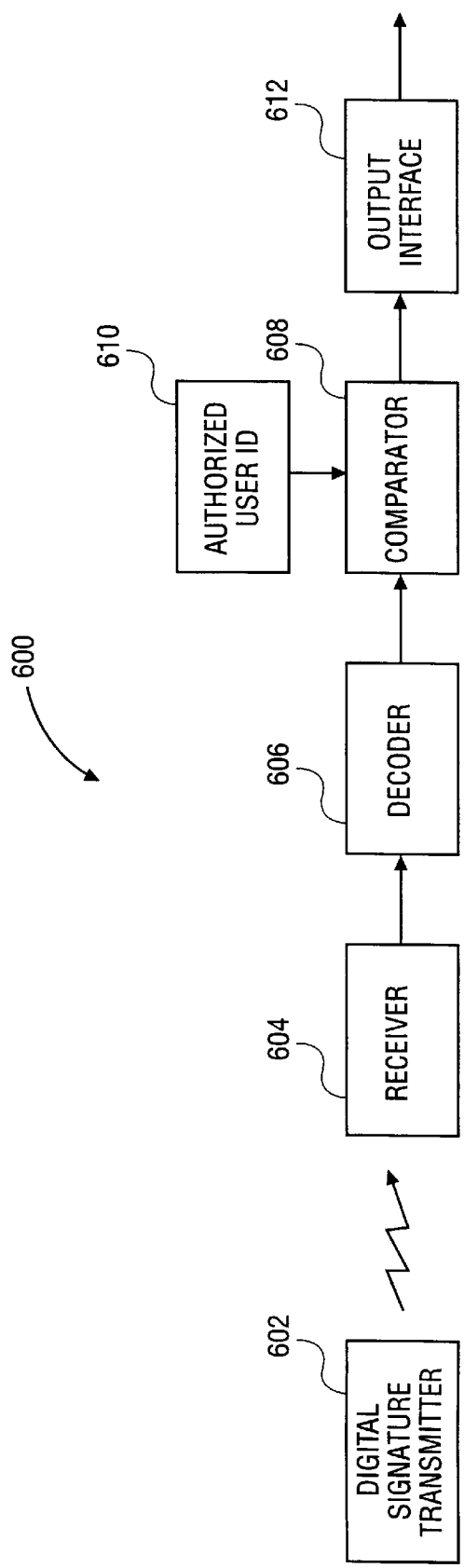
FIG. 6 is a block diagram of a user detection system according to an alternative embodiment of the invention.

FIG. 6 depicts a user detection system 600 for use with a power management system to detect presence of a user according to an alternative embodiment of the invention. In this embodiment, a transmitter 602 is used to transmit a digital signature. The transmitter can be embedded in the user's badge, wristwatch or other devices. The digital signature may be an encrypted message that is used to prove that the person wearing the transmitter has authorization to use the computer. This means that the digital signature is user specific and can only be recognized by the computer that the user has programmed with the transmitter. Also included in the user detection system 600 are a receiver 604 to receive the encrypted digital signature, a decoder 606 to decode the encrypted digital signature received by the receiver, and a comparator 608 to compare the decoded message against an authorized user identification 610. In one implementation, the transmitter 602 is a short-range transmitter such that when the user wearing the transmitter walks away from the computer, for example, more than ten meters, the user detection system 600 will send a command to the output interface 612 indicating that the authorized user has walked away from the computer. For example, the transmitter may be a short range transmitter operating under a Bluetooth wireless link to wirelessly transmit signals to a receiver in the computer. Bluetooth is a communication protocol that may be used to provide a short-range (e.g. 10 meters) wireless communication between portable electronic devices.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An apparatus comprising:
    at least one thermal sensor to sense temperature around a defined area of a computer system; and
    a user presence detection subsystem coupled to said at least one thermal sensor to determine presence of a user based on an amount of temperature fluctuation occurring within a defined time period, wherein the amount of temperature fluctuation is computed based on at least two temperature values measured at different points in time.

2. The apparatus of claim 1, wherein said at least one thermal sensor is placed adjacent to a display screen to sense temperature around a display screen area.

3. The apparatus of claim 1, wherein said at least one thermal sensor is mounted on or adjacent to a keyboard of the computer system to sense temperature around a keyboard area.

4. The apparatus of claim 1, wherein said user presence detection subsystem outputs a power saving command via an output interface to place a selected set of components of said computer system in a power saving mode if said user presence detection subsystem determines that a user is not present in front of a display screen of said computer system, and said user presence detection subsystem outputs a normal operation command via said output interface to place said selected set of components in a normal operation mode if said user presence detection subsystem determines that a user is present in front of the display screen.

5. The apparatus of claim 4, wherein said power saving command and said normal operation commands output by said user present detention subsystem are forwarded to an operating system power management to enable said operation system power management to direct power state transitions of said selected set of components from a normal operation mode to a power saving mode, or vice versa.

6. The apparatus of claim 2, wherein said user presence detection subsystem outputs a power saving command via an output interface to place a selected set of components of said computer system in a power saving mode if said user presence detection subsystem determines that a user is not presently facing a display screen of said computer system, and said user presence detection subsystem outputs a normal operation command via said output interface to place said selected set of components in a normal operation mode if said user presence detection subsystem determines that a user is presently facing the display screen.

7. The apparatus of claim 1, wherein said user presence detection subsystem determines presence of a user by comparing said amount of temperature fluctuation against a threshold value.

8. The apparatus of claim 7, wherein said user presence detection subsystem further comprises a calibration logic to readjust said threshold value.

9. The apparatus of claim 4, wherein said selected set of components comprises at least one of the following: a display device, a display driver, and a graphics controller.

10. The apparatus of claim 1, further comprising an analog-to-digital converter coupled between said at least one thermal sensor and said user presence detection subsystem to digitize analog signals produced by said thermal sensor into digital data before forwarding the data to said user presence detection subsystem.

11. The apparatus of claim 1, wherein said at least one thermal sensor comprises a front thermal sensor and a rear thermal sensor, said front thermal sensor positioned adjacent to a display screen facing towards a user and said rear thermal sensor is positioned behind the display screen facing away from the user.

12. The apparatus of claim 11, wherein said user presence detection subsystem includes a temperature profile analyzing logic to determine presence of a user by comparing temperature fluctuation output by said front and rear thermal sensors.

13. The apparatus of claim 1, wherein said user presence detection subsystem determines presence of a user by determining if a pattern of temperature fluctuation is consistent with a fluctuation pattern of human breathing.

14. A method comprising:
sensing temperature around a display screen area of a computer system;
detecting presence of a user based on an amount of temperature fluctuation occurring within a defined time period, wherein the amount of temperature fluctuation is computed based on at least two temperature values measured at different points in time;
outputting a power saving command to place a selected set of components of said computer system in a power saving mode if presence of a user is not detected; and
outputting a normal operation command to place said selected set of components of said computer system in a normal operation mode if presence of a user is detected.

15. The method of claim 14, wherein said detecting presence of a user further comprises monitoring temperature fluctuation caused by the difference in the amount of heat emitted during inhale and exhale and determine if the pattern of temperature fluctuation is consistent with a normal fluctuation pattern of human breathing.

16. The method of claim 14, wherein said temperature around said display screen area is sensed by a thermal sensor.

17. The method of claim 14, wherein said temperature around said display screen area is sensed by an infrared sensor.

18. The method of claim 14, wherein said detecting presence of a user comprises comparing said amount of temperature fluctuation against a threshold value.

19. A computer system comprising:
a processor;
a memory coupled to said processor;
an input/output controller coupled to said processor;
a display device coupled to said input/output controller via a display driver; and
a user detection system to determine presence of a user based on an amount of temperature fluctuation occurring within a defined time period, wherein the amount of temperature fluctuation is computed based on at least two temperature values measured at different points in time, wherein said user detection system outputs a power saving command to place a selected set of components in a power saving mode if said user detection system determines that a user is not present within a computer area and said user detection system outputs a normal operation command to place said selected set of components in a normal operation mode if said user detection system determines that a user is present in the computer area.

20. The computer system of claim 19, wherein said user detection system is capable of determining if a user is in front of the computer facing said display device.

21. The computer system of claim 19, wherein said user detection system comprises a thermal sensor to sense air temperature and a temperature profile analyzing logic to determine presence of a user based on signals produced by said thermal sensor during a sampling time period.

22. The computer system of claim 21, wherein said presence of a user is detected by monitoring temperature fluctuation caused by the difference in the amount of heat emitted during inhale and exhale and determining if the pattern of temperature fluctuation is consistent with a normal fluctuation pattern of human breathing.

23. The computer system claim 21, wherein the duration of said sampling time period is selected to cover at least one complete breathing cycle.

24. The computer system of claim 19, wherein said user detection system comprises an infrared sensor and a temperature profile analyzing logic to determine presence of a user based on signals produced by said infrared sensor.

25. The computer system of claim 24, wherein said temperature profile analyzing logic detects a user presence by determining if a temperature of an object within a field of view of said infrared sensor falls within a defined temperature range.

26. The computer system of claim 19, wherein said selected set of components comprises at least one of said display device, said display driver and a graphics controller.

27. The computer system of claim 19, wherein said computer system is portable computer and said display device is a liquid crystal display.

28. The computer system of claim 19, wherein said user detection system determines presence of a user by comparing said amount of temperature fluctuation against a threshold value.

29. A computer system comprising:
a processor;
a memory coupled to said processor;
an input/output controller coupled to said processor;

a display device coupled to said input/output controller via a display driver; and a user detection system to determine presence of a user based on an amount of temperature fluctuation occurring within a defined time period wherein the amount of temperature fluctuation is computed based on at least two temperature values measured at different points in time, wherein said user detection system outputs a power saving command to place a selected set of components in a power saving mode if said user detection system determines that a user is not present within a computer areaand said user detection system outputs a normal operation command to place said selected set of components in a normal operation mode if said user detection system determines that a user is present in the computer area; and wherein said user detection system comprises a transmitter to transmit a signal, a receiver to receive said signal transmitted by said transmitter, and a controller coupled to said receiver to determine presence of an authorized user by processing said signal received by said receiver.

30. The computer system of claim 29, wherein said signal transmitted by said transmitter is an encrypted digital signature used by said controller to prove that the user wearing said transmitter has authorization to use said computer system.

31. The computer system of claim 30, wherein said controller comprises a decoder to decode said digital signature received by said receiver and a comparator to compare said decoded digital signature against an authorized user identification stored in a memory.

32. The computer system of claim 29, wherein said transmitter is a short-range transmitter.

\* \* \* \* \*